United States Patent Office 2,982,614
Patented May 2, 1961

2,982,614
PROCESS FOR PRODUCING ALUMINA

István Csordás and Béla Lanyi, Budapest, Zoltán Veress, Karcag-Berekfurdo, and László Vissy, Budapest, Hungary, assignors to Kábel-és Müanyaggyár, Budapest, Hungary No Drawing. Filed Oct. 11, 1957, Ser. No. 689,497

1 Claim. (Cl. 23—142)

This invention is concerned with improvements in or relating to the production of fine-grained alumina suitable for forming hard ceramic bodies.

Ceramic bodies, which have high strength and hardness, may be produced from alumina by sintering. These sintered bodies are often particularly suitable for the operations where a hard surface or edge is required, for example in the manufacture of wire drawing dies or metal cutting tools. In general, the finer the alumina powder, the better the resulting sintered bodies and it is found that alpha-alumina is particularly advantageous in producing such sintered bodies.

We have now found that particularly useful sintered alumina bodies can be produced from fine alumina powder, the maximum diameter of the particles of which being 10 microns and the average diameter thereof 1 micron or less. Such sintered shaped bodies in general not only possess great hardness but also increased resistance to wear and tools produced from such fine alumina show outstanding cutting edge retention.

The production of such fine alumina powder according to the usual grinding process is complicated and costly. The use of voluminous hydrated alumina produced by precipitation from aqueous solution for the production of alumina powder for this purpose is also unsatisfactory since in the course of sintering the fine-grained structure of the hydrated alumina is substantially destroyed.

We have found however that one can conveniently produce a very fine alumina powder from hydrated alumina produced by exposing aluminium bodies amalgamated on the surface to the action of water vapour and oxygen. Under these conditions a hydrated alumina which has a very fine grain structure of colloidal dimensions blooms on the surface of the aluminium body. The hydrated alumina, obtained by the blooming process may be dried and dehydrated to give a very fine-grained alumina which is particularly suitable for the production of the sintered bodies previously described.

According to the present invention, therefore, we provide a process for the production of aluminium oxide of fine-grained structure in which a surface of an aluminium body is amalgamated and exposed to oxygen and water vapour, the hydrated alumina so formed being removed from the said surface and subsequently dehydrated by heat treatment.

The amalgam is usefully produced by contacting, for example by dipping the aluminium body into an aqueous solution of a mercuric salt, for example mercuric chloride or mercuric cyanide. The aluminium body thus amalgamated on its surface is then preferably rinsed with water, any rinsing water adhering to the surface removed and the surface then dried, for example by a stream of air and exposed to the effect of an airstream saturated with water vapour. The blooming is conveniently carried out at a temperature between 25 and 75° C. preferably at approximately 30° C., under which conditions one obtains an hydrated alumina of uniform structure, which grows rapidly and has a silky appearance. Since the oxidation is strongly exothermic care must be taken that the aluminium does not overheat.

To avoid such overheating the aluminium bodies can be in the form of blocks provided with boreholes, which may be cooled by running a liquid coolant such as water therethrough.

In this way hydrated alumina of very fine structure, the grain-size of which does not exceed 0.01 micron is obtained. This hydrated alumina may then be dehydrated and converted into predominantly the gamma-alumina modification by heating to between 1000 and 1100° C. The fine-grained structure is not appreciably destroyed at this temperature and the fine grains of the structure increase in size only insignificantly. The conversion of the hydrated alumina into gamma-alumina is associated with a considerable contraction of volume. The gamma alumina obtained in this manner is advantageously loosened by sieving and the fine powder heated in an oxidizing chamber in a thin layer of a few centimeters thickness to temperatures of between 1400 and 1600° C. and so substantially converted into the alpha-alumina modification.

In alpha-alumina produced in this manner the fine grains are somewhat stuck together and should preferably be separated. This can conveniently be carried out in a wet ball mill and the alumina powder finally obtained is of suitable grain-size for the production of sintered alumine bodies. In order to avoid impurities one uses corundum balls in the mill, whereby the inner wall surface of the mill is provided with coating, which contains no ashforming material for example, of an artificial resin.

The step of reduction in size of the alpha-alumina can be avoided by subjecting the gamma-alumina powder to air sifting. Gamma-alumina powder of suitable grain size is passed through an oxygen-containing chamber, heated to 1400–1600° C. and thus converted into the alpha-alumina modification. In one convenient modification of the process gamma-alumina powder is introduced into the upper part of such a chamber and allowed to fall under gravity. The alpha-alumina powder may then be collected at the bottom of the chamber. The fine gamma-alumina powder may also be moved through a heated chamber by means of an airstream, but in this case the individual grains of gamma-alumina, owing to the gas vortices which are set up, have more opportunity to come into contact and so promote the formation of larger grains.

In order that the invention may be fully understood the following example is given only as an illustration:

Example

For the purpose of producing hydrated alumina aluminium blocks of dimensions: 16 x 24 x 60 cm. are used. These blocks are each provided with a longitudinal borehole 30 mm. in diameter, into which an iron pipe is fitted through which cooling water is passed and the block thereby cooled. The iron pipe also serves as support for the aluminium block. The aluminium block is then dipped for a few minutes into a saturated aqueous solution of mercuric chloride and after removal from the solution the surface is rinsed with water, freed from adhering rinsing water by a warm airstream and dried. The aluminium blocks provided on their surface with amalgam in this manner are then exposed in a chamber to the effect of an airstream saturated with water vapour at a temperature of 30° C. for a few hours, conveniently for 2–3 hours. Hydrated alumina of fine structure forms on the surface of the block and for the most part falls away from the aluminium block. The blooming slows down after a few hours and the aluminium block is therefore removed from the blooming chamber, the still adhering hydrated alumina removed with a brush and the amalgam layer renewed by dipping, as described above. The aluminium block is again introduced into the blooming chamber and the above process repeated. This is continued until 60% of the aluminium initially in the blocks has been converted into hydrated alumina, the surface of the aluminium block having so been reduced during the above treatment, that it is desirable to replace the blocks by fresh ones.

From one aluminium block, of the above dimensions, one can produce by the process described above 6 kg. of hydrated alumina in 24 hours' operating time. This hydrated alumina is converted in 20–25 cm. high layers at 1000–1100° C. into gamma-alumina, which is then sieved through a fine sieve and heated to 1400–1600° C. in fireclay or sillimanite muffles in layers 4–5 cm. thick in an oven of the kind commonly used in ceramics provided with an oxidizing atmosphere. The alpha-alumina thus obtained is then reduced in size in a ball mill with a synthetic resin coating, using corundum balls, until an average grain-size of 1 micron is obtained. The fine alpha-alumina powder obtained in this way may be used directly for the production of sintered corundum shaped pieces.

What we claim is:

A process for the production of hydrated aluminum oxide of fine-grained structure, chiefly for metal-ceramic purposes, comprising amalgamating a surface of an aluminum body by contacting it with an aqueous solution of a mercuric salt, said aluminum body having the form of a block, rinsing said surface with water, drying it, exposing it to a gas stream containing oxygen and water vapor at a temperature from 25 to 75° C. to form hydrated alumina on said surface, cooling said block by passage of a cooling medium through holes in the block, removing the so-formed alumina from said surface, dehydrating said alumina predominantly to gamma-alumina by heating it to a temperature from 1000 to 1100° C., disintegrating the alumina thus obtained, and converting it to alpha-alumina by heat treatment at a temperature from 1400 to 1600° C.

References Cited in the file of this patent

UNITED STATES PATENTS

| | | |
|---|---|---|
| 2,449,847 | Heard | Sept. 21, 1948 |
| 2,643,935 | Halversen | June 30, 1953 |
| 2,746,842 | Bloch | May 22, 1956 |
| 2,780,525 | Wendell et al. | Feb. 5, 1957 |
| 2,799,558 | Smith | July 16, 1957 |
| 2,820,693 | Hervert et al. | Jan. 21, 1958 |
| 2,837,451 | Hannon | June 3, 1958 |

FOREIGN PATENTS

| | | |
|---|---|---|
| 533,994 | Canada | Dec. 4, 1956 |

OTHER REFERENCES

Industrial and Engineering Chemistry, vol. 42, July 1950, "Thermal Transformations of Aluminas and Alumina Hydrates," by H. C. Stumpf et al., pages 1398 to 1403.